3,559,095
NUCLEAR ENERGY PUMPED LASER
Niel E. Nielson, Los Altos, Calif., assignor to Lockheed Aircraft Corporation, Burbank, Calif.
Filed Jan. 5, 1968, Ser. No. 703,205
Int. Cl. H01s 3/09
U.S. Cl. 331—94.5                              7 Claims

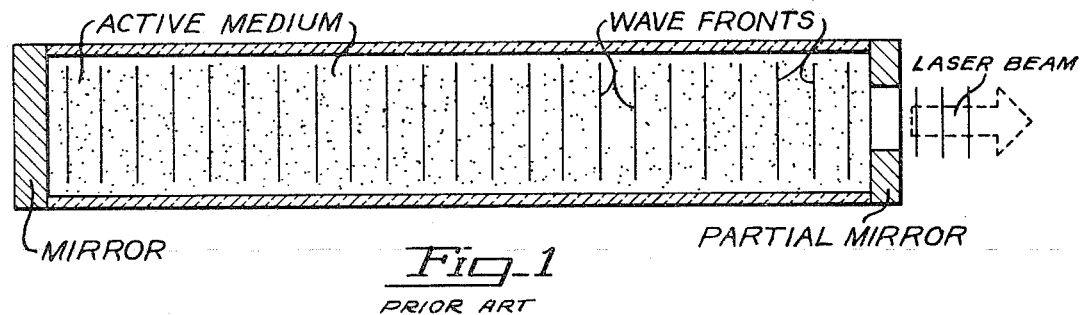
Fig_1
PRIOR ART
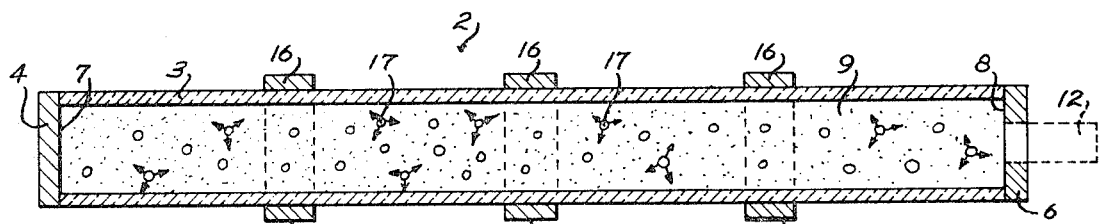
Fig_2
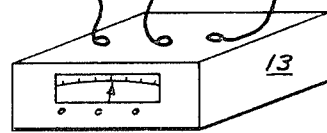
Fig_3
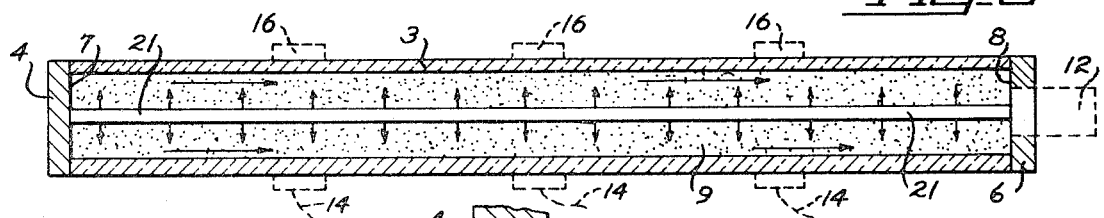
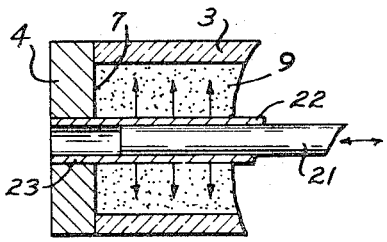
Fig_4
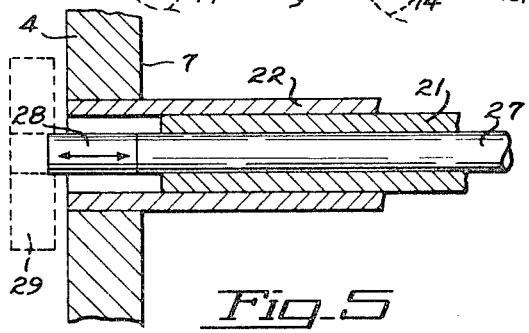
Fig_5
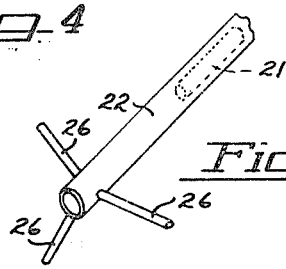
Fig_6
INVENTOR
NIEL E. NIELSON
BY George C. Sullivan
Agent United States Patent Office 3,559,095
Patented Jan. 26, 1971

ABSTRACT OF THE DISCLOSURE

A laser device is provided in which the lasing substance is pumped to an energy level consistent with lasing action by radiation from a source of nuclear energy. The source of radiation is contained within the enevelope which contains the laserable substance when such laserable substance constitutes a gaseous compound, and is supported in conjunction with the laserable substance when such laserable substance constitutes a solid. Sources of radiation found to be effective include alpha-emitting radioactive material such as polonium-210 and plutonium-238, and gamma-emitting materials such as cobalt, cesium and strontium.

BACKGROUND OF INVENTION

The technology surrounding the development of "masers" and "lasers," these words being, respectively, acronyms for the phrases "microwave amplification by stimulated emission of radiation" and "light amplification by stimulated emission of radiation," is progressing at a rapid rate. With specific reference to lasers, devices have been produced which will provide high energy pulses of highly coherent light, and which will produce a continuous wave (CW) of a highly coherent beam of light. In general, the high energy pulse-type lasers have centered around solid-type lasing substances, such as ruby, glass, ceramic, etc., whereas the continuous wave lasers have been designed around lasing substances in a gaseous state, such as carbon dioxide, helium, neon, nitrogen, and other combinations of materials.

To operate conventional state-of-the-art lasers, it is necessary to expend a considerable amount of energy in order to initiate the lasing action, and such conversion or transfer of energy has been effected rather inefficiently. For instance, in a pulsed-type laser, it is not uncommon to utilize 1,000 watts of outside energy to effect a lasing action which will produce only 100 watts of light energy.

The relatively recent development of the $CO_2$ laser which in general utilizes a gaseous mixture approximating 1 torr $CO_2$, 1 torr nitrogen and 5 torrs helium appears capable of reversing this trend so that more power is secured from the laser than is required to initiate lasing action. Heretofore, this outside energy has been provided through the use of electromagnetic radiation in the form of radio frequency pulses to which the lasing substance was subjected. It is one of the principal objects of the present invention to provide a radioactive source of radiant energy which will raise the laserable substance to an energy level at which lasering action will be initiated by stimulated emission, or which will raise the laserable substance to an energy level just below such requisite level so that the ultimate lasering energy level may be reached by augmenting the primary radioactive source of radiation through electromagnetic means working in conjunction therewith.

The necessity of utilizing exterior energy sources to raise the laserable substance to an energy level capable of initiating stimulated emission of radiation has required the use of bulky components and high voltage and therefore dangerous sources of power. It is therefore another object of this invention to eliminate the necessity of such external sources of energy and to provide a radioactive source of radiation in close association with the laserable substance.

For maximum portability and utility, it is desirable that lasers be designed having a minimum bulk and maximum power output. These concepts require that a self-contained source of energy be provided capable of control to selectively impart to the laserable substance an energy level at which the lasering action will be initiated. Accordingly, it is a still further object of this invention to provide a laser including a body of laserable substance which is supported in association with a radioactive source of radiation selected from the group consisting of polonium-210 and plutonium-238.

Heretofore, the control of lasering action in a substance capable of such lasering action has been dependent upon controlled energization of an outside source of electromagnetic radiation. Such control has necessitated the use of bulky and expensive components and high voltages which are cumbersome and dangerous to use. Accordingly, it is a still further object of the invention to provide an internal radioactive source of radiant energy such as polonium-210, and to provide means for controlling such radioactivity to selectively raise the energy level of the laserable substance to such level that lasering action will be initiated.

SUMMARY OF INVENTION

In terms of broad inclusion, the invention comprises the utilization of a radioactive source of radiant energy such as polonium-210, plutonium-238, cobalt, cesium, or strontium, in conjunction with a body of laserable substance. The body of laserable substance may be in the form of a solid, or it may be in the form of a gaseous compound. In one aspect of the invention, the laser includes a body of laserable substance such as carbon dioxide, helium and nitrogen contained within a hermetically sealed envelope formed conveniently from a tube of quartz the opposite ends of which are provided with end walls having mirrored surfaces as is conventional in the laser art. The envelope thus formed constitutes a resonant cavity capable of resonating at predetermined frequencies correlated to the laserable substance and the dimensions of the envelope. Supported within the resonant cavity, in concentric relation to the body of laserable substance is an elongated tube or rod of radioactive material such as cobalt, cesium, strontium, plutonium-238 or polonium-210. The proportions of the parts and their cooperative relationships are such that the intensity of radiation from the radioactive source is sufficient to raise the energy level of atoms of the laserable substance to the energy level necessary for initiating lasering action. Means are provided in conjunction with the radioactive source to selectively control the radiation to thereby control the intensity of bombardment of the laserable substance so that lasering action may be selectively initiated or quenched.

BRIEF DESCRIPTION OF DRAWINGS

FIG. 1 is a cross-sectional view illustrating schematically the basic structure of a simple conventional laser shown apart from an outside source of electromagnetic energy.

FIG. 2 is a cross-sectional view illustrating schematically a laser embodying one aspect of this invention in which radioactive molecules are dispersed in the body of laserable substance of a gaseous type laser, and illustrating electromagnetic means for augmenting the radiation from the radioactive source.

FIG. 3 is a cross-sectional view illustrating schematically a different embodiment of a gas laser utilizing a radioactive source of radiant energy in the form of an elongated cylindrical rod of radioactive material disposed concentrically within the body of laserable substance.

FIG. 4 is a fragmentary view in vertical section illustrating one method and means of supporting the relatively fragile rod of radioactive material within the envelope of the laser.

FIG. 5 is a fragmentary view in vertical section illustrating one method and means of introducing an absorbing medium such as boron to selectively control energization of the laser.

FIG. 6 is a fragmentary view in perspective illustrating another method and means of supporting the fragile rod of radioactive material within the transparent quartz tube forming the envelope of the laser device.

DESCRIPTION OF PREFERRED EMBODIMENT

Although the laser art is relatively young, being less than ten years old, almost everyone has some idea of what a laser is and does. Lasers belong to the family of masers, in that they use C. H. Townes' idea of combining excited stimulable atomic systems with a resonator to produce coherent emission. A basic structure capable of producing such coherent emission was suggested in 1958 by Arthur L. Schawlow and C. H. Townes and is illustrated in FIG. 1. As there shown, the excited atoms in the active medium are contained within a long narrow column having mirrors facing each other at each opposite end. As viewed in FIG. 1, the mirror on the right end of the column is partially transparent, while the mirror on the left end of the column is completely opaque or very highly reflective. The principle upon which the laser operates is that a light wave of proper frequency or wave length, which starts anywhere in the region of excited atoms, can be amplified or grow by stimulating other atoms to emit and contribute to the light wave. It is a peculiarity of the laser that only waves traveling very nearly along the axis of the column remain within the column. Waves traveling in other directions are lost out the transparent sides of the column. By careful design and positioning of the mirrors at opposite ends of the column, the waves which travel along the axis are reflected back and forth between the mirrors and build up an amplitude which is ultimately limited by the supply of excited atoms within the column. To lend utility to the device, it is necessary that light be permitted to escape from or "leak out" of the column. To achieve this result, the mirror at the right end of the column as viewed in FIG. 1 is partially transparent and permits light in the form of a very intense and directional beam of coherent radiation to escape from the column.

Thus, from a relatively simple structure are produced the distinctive properties of a laser. The power of the laser is determined by the degree of stimulation of the atoms to emit radiation. Obviously, in order to secure a lasering effect they must be stimulated to emit radiation faster than they would naturally emit if left undisturbed. The directional quality of the output light results from the fact that only those waves traveling substantially parallel to the axis remain within the system long enough to build up a large intensity. Additionally, the output light is monochromatic because of the resonant nature of the process of stimulated amplification. Coherency in the output light or beam is derived because most of the atoms within the column are forced to contribute to that wave which is temporarily stored between the mirrors. This is in direct contrast to all ordinary light sources in which emission of light radiation takes place quite independently from each excited atom. It is of course well known that the active medium in a laser may be either a solid, liquid or gas. In recent years it has been discovered that the medium may also be an insulator or a semiconductor.

It is now generally known that certain active substances may be stimulated to emit radiation. Light is of course a form of radiation, and through the development of laser technology, substances capable of emitting coherent light through stimulated emission of radiation have been identified. To effect such stimulation, it is generally necessary to impart energy to the body of substance subject to stimulation from an outside source. In conventional laser devices, such energy from an outside source has in some instances taken the form of light itself, and in other instances has taken the form of electromagnetic radiation in the radio frequency spectrum.

A list of gaseous mediums capable of being stimulated to emit radiation are listed in a paper published in the October 1966 issue of Applied Optics, vol. 5, No. 10, p. 1502. The list includes such compounds as neon, nitrogen, argon, krypton, combinations of helium and neon, and combinations of carbon dioxide, nitrogen and helium. Even water has been utilized as a medium capable of being stimulated to emit radiation. As indicated in the publication noted, a gas laser utilizing the medium carbon dioxide, nitrogen and helium will produce a coherent light beam having a wave length of 10.6 microns. The laser will have a physical length of approximately 2 meters, and will require approximately 1,000 watts of power input to secure 100 watts of power output. In general, this ratio of power in to power out is considered to be at the upper level of efficiency attainable with conventional gas lasers of the $CO_2$ variety. So far as is known, all gaseous type lasers are raised to an energy level sufficient to sustain stimulated emission of radiation through the utilization of increased temperatures and/or the application of RF electromagnetic energy to "pump" the gas medium to initiate lasering action.

Referring to FIG. 2, there is there shown in schematic form a gas laser designated generally by the numeral 2, and including a transparent tubular envelope 3, formed preferably from quartz sealed at each opposite end by end walls 4 and 6. End wall 4 is preferably fabricated from Invar because it has a very low coefficient of thermal expansion and contraction. Wall 4 is sealed to the associated end of quartz tube 3 in a manner to effect a hermetic union. The inside surface 7 of wall 4 is highly reflective, while end wall 6 is partially transparent and partially reflective from surface 8 in order to reflect light waves emitted from atoms forming the molecules of the laserable substance 9 contained within quartz tube 3, which may be taken to be a mixture of carbon dioxide, nitrogen and helium. The partial transparency of end wall 6 is provided to permit escape or "leakage" of the highly coherent beam of light 12.

As discussed above, energy from an external source may be imposed upon the laserable medium 9 through use of an RF generator 13 having leads 14 connected to metallic bands 16 encircling the transparent quartz tube. Energization of the RF generator imparts RF energy in the form of electromagnetic radiation to the laserable medium 9, and, depending upon the medium used as the laserable material, more or less electromagnetic energy at radio frequencies may be imparted to the body of laserable substance.

In accordance with the aspect of the invention illustrated in FIG. 2, the primary source of radiant energy utilized to effect elevation of the energy level of the molecules in the laserable medium constitutes radioactive molecules 17 of the same gases forming the laserable medium, or radioactive molecules of some other suitable substance that may be dispersed throughout the body of laserable substance and remain suspended therein. The radioactive molecules 17 preferably constitute a source of radiant energy having an oscillating frequency of at least $10^{19}$ cycles per second and possess a half-life sufficiently long to make the utilization of radioactivity as a source of radiant energy economically feasible in a laser system. In some instances, it may be desirable that the intensity of radiation be uncontrolled. Under these circumstances, the radiation level of the radioactive molecules should be sufficiently intense that whenever conditions upon which lasing is dependent are favorable, lasing will be initiated and will continue until unfavorable conditions are imposed.

On the other hand, in some environments, it may be desirable that the radiation intensity be controlled so that lasing may be selectively initiated or extinguished. Under these circumstances, the intensity of radiation of the radioactive material is selected so that the energy level of the laserable medium is held just below the level of energy necessary to maintain lasering. When used in this manner, the radiant energy provided by the radioactive material is augmented by either a favorable change of condition, such as an increase in temperature, or through electromagnetic energy imposed by the RF generator 13.

The additional energy from the RF generator, or the more favorable condition, is imparted at the time that lasing is desired. It will thus be seen that in this aspect of the invention, whether the laser is pulsed or continuous, it would require the introduction of a comparatively small amount of additional electromagnetic energy to precisely control stimulation of emission of radiation. For several reasons, such as availability, radiation characteristics, and biological susceptibility to radiation, it is preferred that alpha-emitting materials be utilized as the radioactive source 17.

In FIG. 3 is shown a different embodiment of a laser which preferably receives all or a part of its input energy from an alpha-emitting radioactive source. As discussed above, placement of a substance capable of lasing in a radioactive environment will either reduce the amount of externally provided electromagnetic energy necessary to cause lasing, or will entirely eliminate the need for such external source of energy, dependent upon the laserable substance employed and the level of radioactivity into which the laserable substance is placed.

Light amplification by stimulated emission of radiation initiated by the application of energy from an RF source such as the RF generator 13 in FIG. 2, requires acceptance of very low efficiencies in terms of electrical energy input versus lasing energy output. In accordance with this invention, such RF energy may be replaced wholly or in part by a radioactive source of energy. Such a substitution offers a significant potential for cost efficiencies, and experiments thus far have indicated greatly improved power/weight ratios.

In the embodiment illustrated in FIG. 3, parts corresponding to similar parts in FIG. 2 have been correspondingly numbered. This embodiment differs from the embodiment illustrated in FIG. 2 in that the radioactive material utilized as a principal source of radiant energy effective to raise the energy level of the laserable medium to the requisite level to initiate lasering action is provided in the form of an elongated rod 21 coaxially disposed within the quartz tube 3, and supported at each opposite end in any suitable manner such as end walls 4 and 6. In a preferred form, the rod of radioactive material 21 comprises the alpha emitting material polonium-210.

Another radioactive material that is believed to be suitable in that it emits alpha radiation which fits the constraints of biological health to humans, is plutonium-238. This latter material offers three significant advantages: (1) It is a radioisotope with which shielding is not a problem; (2) it has a very high density, thus enabling fabrication through the utilization of thin film deposition techniques; and (3) it has a very long half-life in the order of 89.6 years, thus assuring a stable radiation environment over an extended interval. Plutonium-238 may also be used in its oxide form, which constitutes one of its most stable forms. In the oxide form, plutonium-238 possesses a specific power of .39 watt per gram. Assuming some unwanted absorptions, resulting in power loss, the effective specific power of the oxide form of plutonium-238 should approximate .2 watt per gram.

The literature on $CO_2$ lasing systems teaches that a 100 watt $CO_2$ gas lasing system has demonstrated a requirement of at least 500 watts of electrical energy supplied from an exterior source. Thus, if plutonium-238 in its oxide form is to be substituted for this outside source of electrical energy, sufficient plutonium-238 at .2 watt per gram must be employed to gain the 500 watts noted.

Considering worst-case inefficiencies determined through experiments, this would require approximately 2,500 grams of plutonium-238 in its oxide form. While the rod 21 of radioactive material in FIG. 3 has been illustrated as a uniform diameter rod extending the full length of the enclosing quartz tube 3, it is clear that the radioactive material may be cast in other configurations, such as a tubular form having a larger or smaller diameter, or a longer or shorter length. Obviously, the diameter of the quartz tube 3, the pressure of the laserable medium, the proportions of radioactive material and the intensity of radiation may be determined through the application of known mathematical formulae to achieve the energy levels required for different laserable compounds.

In FIG. 3, radiation from the rod 21 is represented schematically by the arrows extending transversely thereof, while stimulated emission of radiation is indicated schematically by the longitudinally extending arrows positioned adjacent the walls of the quartz tube 3.

Where the rod 21 of radioactive material is formed from polonium-210, the rod will have a much shorter half-life, approximately 38 years as opposed to 89 years for plutonium-238, but the polonium-210 offers a very distinct advantage in that much less radioactive material is required. Again, assuming the same low efficiencies discussed above, 67 watts per gram can be realized utilizing polonium-210 as opposed to .2 watt per gram when plutonium-238 is used as the radioactive material. Accordingly, to produce approximately 500 watts of energy, only approximately 7½ grams of polonium-210 is required. It should be noted that these relative figures of watts per gram have been determined through thermal energy studies and experiments and must therefore be considered to be worst-case values. As with plutonium-238, the polonium-210 may be fabricated as an elongated cylindrical rod as illustrated in FIG. 3, or it may take some other more convenient configuration such as a tubular configuration of greater or less diameter, and greater or less length than the quartz tube 3.

It is generally known that radioisotopes formed from either plutonium-238, especially in its oxide form, or polonium-210 are fragile, thus making special handling or mechanical stabilization desirable. Either of these two materials, when formed in an elongated rod, may be adequately supported from the standpoint of mechanical rigidity by a metallic sheath 22, conveniently fabricated from titanium, which does not intercept or deleteriously affect the intensity of radiation from the enclosed radioactive rod 21, and which may be supported in any suitable manner on or adjacent to the end walls. As shown in FIG. 4, the end 23 of the sheath in the form of titanium tube 22 is embedded in end wall 4.

In this aspect of the invention, it is contemplated that the titanium tube 22 may extend the full length of the quartz tube 3, so that the polonium-210 or plutonium-238 rod may be permanently held concentrically disposed with respect to the quartz tube 3 by the sheath.

In some instances, it may provide a deleterious effect to have the titanium tube 22 project through the end wall 4. Under these circumstances, the structure illustrated in FIG. 6 may be utilized, wherein the ends 24 of the titanium tube merely abut the inside surfaces of the end walls 4 and 6, and the tube is held concentrically disposed with respect to the quartz tube 3 by a plurality of radially extending spokes 26 as shown. At least three of such spokes must be provided to retain the titanium tube concentrically disposed within the quartz tube.

In some instances, to effect control of radiation, it may be desirable that the radioactive source be withdrawn from the lasing device. As indicated in FIG. 4, the rod 21 of radioactive material may be moved axially with respect to the enclosing and supporting titanium tube 22, so as to withdraw the source of radiation from the lasing device. Such withdrawal will affect the intensity of radiation, or the dispersion of radiation with respect to the laserable medium 9, and will provide some measure of control of initiation of lasering.

Selective control of stimulated emission may also be effected by providing an absorbing medium for the radioactivity emanating from rod 21. FIG. 5 illustrates this embodiment. A rod 27 of an absorbing medium such as boron, is arranged for longitudinal translation with respect to the radiating source 21. As shown, the radioactive source is a tubular body supported by the metallic sheath 22, fabricated from titanium. The boron rod 27 functions to absorb a sufficient amount of radiation from the radioactive source to reduce the energy level of the medium 9 below the energy level requisite to initiate lasering.

The longitudinal translation of the boron rod may be effected in many different ways. For instance, a magnetizable slug 28 may be attached at one end to the boron rod to function as an armature. Being magnetizable, the slug is responsive to the magnetic field generated by an appropriate electromagnetic coil 29. The coil 29 may be arranged for movement longitudinally with respect to the laser device to effect insertion or extraction of the boron rod over whatever length is desired. Alternatively, mechanical means such as a rack and pinion arrangement (not shown) may be utilized to effect longitudinal translation of the boron rod.

From the foregoing it will be obvious that the utilization of nuclear energy to provide the radioactive source of radiant energy to raise the laserable medium to the energy level requisite for initiation of lasering provides many advantages not found with conventional external energy sources as presently used in conjunction with lasers. The advantage of long life is apparent, as is the advantage of remote control. The relatively small volume required by the radioactive source, and the capability of selectively controlling it by the imposition of external stimuli, to initiate or extinguish lasering, make the nuclear energy inspired laser of this invention suitable for use in conventional airborne and space vehicles.

I claim:
1. In a device for emitting a beam of coherent light, a substance having molecules at a first energy level capable of being raised to another energy level where amplification of energy will be effected by stimulated emission of radiation, a tubular body of alpha emitting radioactive material in operative association with said substance to raise the energy level of at least some of the molecules thereof to said other energy level, and a body of boron selectively slidable within said tubular body of alpha emitting radioactive material.

2. In a device for emitting a beam of coherent light, a substance having molecules at a first energy level capable of being raised to another energy level where amplification of energy will be effected by stimulated emission of radiation, a radioactive source of radiant energy in operative association with said substance to raise the energy level of at least some of the molecules thereof to said other energy level and means for controlling the intensity of radiation selected portions of said substance capable of lasing received from said radioactive source of radiant energy, said radiation control means comprising a body of boron selectively placed in association with said radioactive source of radiant energy to absorb or less of the radiation therefrom.

3. The method of raising a laserable substance to an energy level at which lasing will be initiated comprising the step of bombarding said laserable substance from a radioactive source of radiant energy selected from the group consisting of cobalt, cesium, strontium, polonium-210 and plutonium-238, or combination thereof, and of controlling the intensity of bombardment of said laserable substance comprising the step of introducing a radiation absorbing medium into association with said radioactive source of radiant energy to absorb a portion of said radiant energy to reduce the energy level of said laserable substance below the energy level required for lasing.

4. In a laser, a source of energy for pumping a body of laserable substance to an energy level sufficient to initiate lasing action, comprising an elongated, tubular rod of polonium-210 encased within a metallic sheath and a body of material capable of absorbing radiant energy from said tubular rod selectively slidable within said tubular rod.

5. The combination according to claim 4, in which means are provided to selectively translate said body of absorbing material longitudinally with respect to said tubular rod of polonium-210.

6. In a laser, a source of energy for pumping a body of laserable substance to an energy level sufficient to initiate lasing action, comprising an elongated tubular rod of plutonium-238 encased within a metallic sheath and a body of material capable of absorbing radiation from said elongated, tubular rod selectively slidable within said elongated, tubular rod.

7. The combination according to claim 6, in which means are provided to effect longitudinal translation of said body of absorbing material with respect to said tubular rod of plutonium-238.

References Cited
UNITED STATES PATENTS

| | | | |
|---|---|---|---|
| 3,391,281 | 7/1968 | Eerkens | 332—7.51X |
| 3,159,707 | 12/1964 | Bennett, Jr. et al. | 331—94.5 |
| 3,234,099 | 2/1966 | Baldwin et al. | 331—94.5X |
| 3,281,600 | 10/1966 | Vali et al. | 331—94.5X |
| 3,309,622 | 3/1967 | Weiner et al. | 331—94.5 |

OTHER REFERENCES

Dezenberg et al.: "The Use of a Multipath Cell as a $CO_2$-N Gas Laser Amplifier and Oscillator," Applied Optics, September 1967, pp. 1541–1543.

RODNEY D. BENNETT, JR., Primary Examiner

T. H. TUBBESING, Assistant Examiner

U.S. Cl. X.R.
330—4.3; 332—7.51